June 19, 1962 L. BERGER 3,039,465

DISC FOR SURGICAL DRAINAGE DEVICE

Filed June 21, 1960 2 Sheets-Sheet 1

INVENTOR.
LEON BERGER

BY

ATTORNEY

June 19, 1962 L. BERGER 3,039,465

DISC FOR SURGICAL DRAINAGE DEVICE

Filed June 21, 1960 2 Sheets-Sheet 2

INVENTOR.
LEON BERGER
BY
Zoltan H. Polachek
ATTORNEY

United States Patent Office 3,039,465

Patented June 19, 1962

3,039,465

DISC FOR SURGICAL DRAINAGE DEVICE

Leon Berger, Rosedale, N.Y., assignor to Atlantic Surgical Company, Inc., Rosedale, N.Y., a corporation of New York Filed June 21, 1960, Ser. No. 37,757
1 Claim. (Cl. 128—283)

This invention relates to surgical devices and more particularly concerns an apertured disc adapted to support and form part of a surgical drainage member.

Heretofore, surgical drainage devices have employed discs and pad of various types which were secured to the patients' bodies by belts, straps and harnesses. Such supports were likely to shift with injury to the mucous membrane.

The present invention avoids the difficulties and disadvantages of prior devices by providing a disc for a surgical drainage device so constructed that it will not shift or skid or move about the body. It conforms to the body of the patient and adheres securely thereto. Adhesives may or may not be used and medicaments may be inserted which are important advantages for patients with tender and sensitive skins. The disc embodying the invention is a circular member provided with a plurality of grooves in one face. These grooves act as a concentric series of suction compartments. In addition, a plurality of circumferentially spaced cavities in the flat face of the disc provide a multiplicity of closed compartments which act like suction cups in conjunction with the grooves to add security whereby the disc is less likely to shift. The disc may be formed of rigid or flexible material. In a modified construction the grooved face may have ridges of different depths to adhere more securely to a curved body surface. Salves or ointments may be inserted in the grooves for healing purposes.

It is therefore one object of the invention to provide a disc for supporting a surgical drainage member on the body of a patient that is not likely to shift on the body of the patient.

A further object is to provide a rigid or flexible centrally apertured disc with concentric grooves in one face and a plurality of circumferentially spaced concavities in the one face outside of the grooves near the periphery of the disc.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 7:
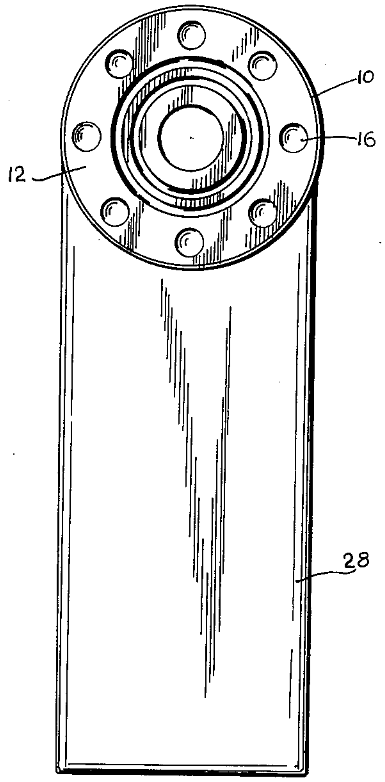
FIG. 7 is a front elevational view, showing the application of the disc device.
Figure 8:
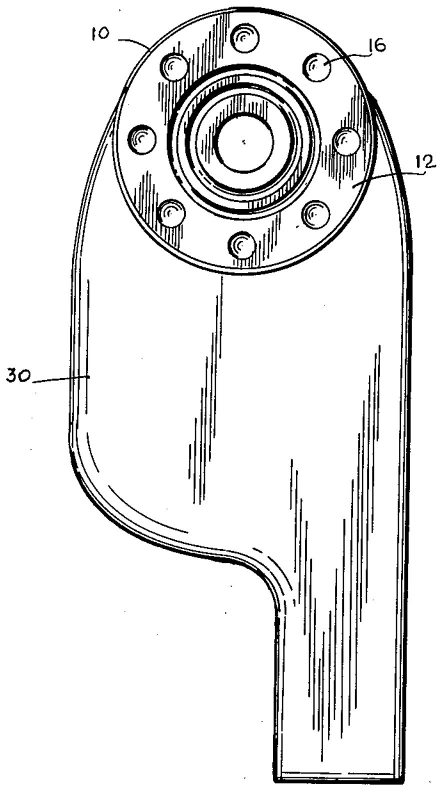
FIG. 8 is a similar view to FIG. 7, showing another form of application of the disc device.

In FIGS. 1–4 is shown a circular disc 10 having a flat front face 12 and a flat rear face 14. Face 12 is provided wtih a series of circumferentially spaced semi-round concavities 16 which serve as suction cups when the disc is pressed against the body of a patient around a surgical cavity requiring drainage. In addition, a plurality of concentric grooves 18, 20 of the same or different depths are provided around the central hole 22 in the disc, the grooves being disposed radially between the hole 22 and the concavities 16. The hole 22 has an annular seat 24 formed in its rear face 27 for receiving a flanged end 25 of a tube 26 or drainage bag. The disc may be formed as part of semi-molded or molded appliances, such as the rectangular-shaped bag 28 shown in FIG. 7 or the irregular-shaped bag 32 shown in FIG. 8. The improved disc may also be used in appliances with removable discs. The flanged end can be cemented to the disc or otherwise applied and secured at the hole 22. The tube 26 is shown only in dotted lines in FIG. 4 to show details of the disc itself more clearly.

The disc may be formed of rigid or flexible rubber, plastic or metal material but flexible material is preferred. The flat face of the disc when placed against a patient's body and pressed gently, will be found to adhere securely and will not shift even though the patient moves around and some strain is placed on the drainage member 26. It is particularly important that drainage devices applied to surgically formed openings in abdominal walls be securely located. Movement of surgical drainage devices at such openings may injure intestinal walls which is most undesirable. The present invention has been found to resist displacement by suction to the body and because of its non-skid features will not shift while in use.

If desired, salves, ointments, gums or other healing medicaments may be inserted into the grooves for application to the skin of the patient without interfering with the adherence of the disc to the body of the patient.

Figure 1:
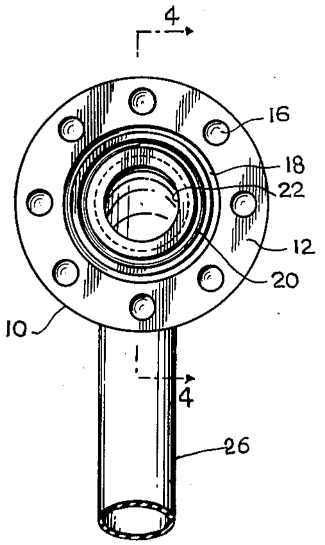
FIG. 1 is a front elevational view of a disc embodying the invention, applied to a surgical tube.
Figure 2:
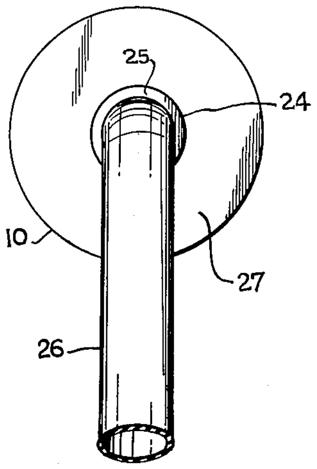
FIG. 2 is a rear elevational view of the device of FIG. 1.
Figure 3:
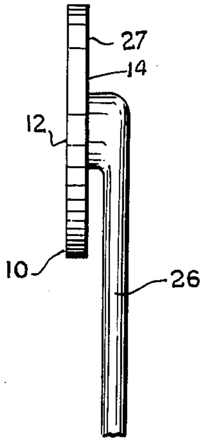
FIG. 3 is a side elevational view of the device of FIG. 1.
Figure 5:
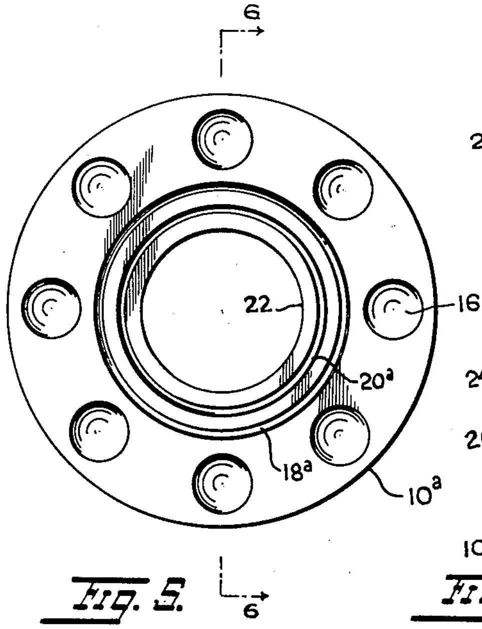
FIG. 5 is a front elevational view of another disc embodying the invention, on a larger scale.
Figures 4, 6:
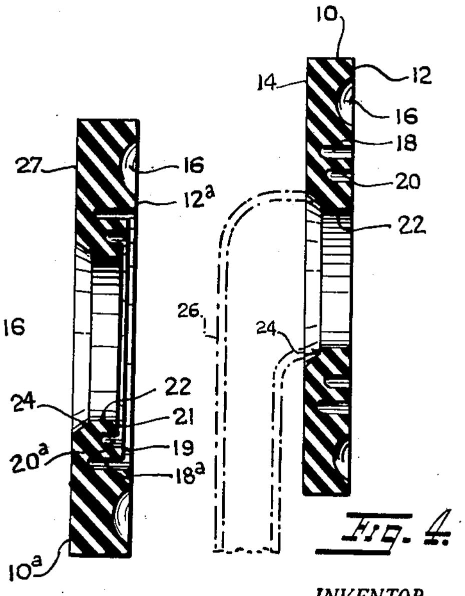
FIG. 4 is a sectional view on an enlarged scale taken on line 4—4 of FIG. 1, the tube being shown in dot-dash lines.
FIG. 6 is a sectional view taken on line 6—6 of FIG. 5.

In the form of the invention shown in FIGS. 5 and 6, the disc $10^a$ is similar to disc 10 in the provision of concavities 16, hole 22 and seat 24. Grooves $18^a$ and $20^a$ have different depths so that groove $18^a$ extends deeper into the disc from face $12^a$ than groove $20^a$. In addition, two flat faced ridges 19 and 21 are defined between grooves $18^a$, $20^a$ and between groove $20^a$ and hole 22, respectively. The ridges extend inwardly from face $12^a$ with progressively greater depth. This configuration of the disc face is especially adapted for application of the disc to a rounded or convex body surface. Disc $10^a$ may be formed of rigid or flexible material.

The use of discs 10 or $10^a$ minimizes leakage and/or shifting. The present surgical disc remains more securely located when in use.

The several discs can be fabricated at low cost. The discs may be reused but because of the low cost of manufacture they may be discarded along with the drainage device 26 after a single use.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A self-supporting surgical drainage device, comprising a flexible, circular disc having a multiplicity of concavities equally and circumferentially spaced around one flat face of the disc, each of said concavities being substantially semispherical and being substantially semicircular in cross section so that said disc adheres solely by suction to the body surface of a patient when applied thereto, said disc having a central hole to receive a drainage tube, said flat face being formed with a plurality of concentric continuous grooves radially spaced inwardly of said concavities for receiving circular areas of said body surface to seal said flat face hermetically to the body surface, said grooves being of different depths axially of the disc and said disc having circular ridges of different axial lengths concentric with said grooves and alternating therewith radially of the disc to engage the body surface and prevent lateral movements of the disc with respect to the body surface.

References Cited in the file of this patent

UNITED STATES PATENTS

| | | |
|---|---|---|
| 1,441,384 | Thomas et al. | Jan. 9, 1923 |
| 2,144,092 | Werner | Jan. 17, 1939 |
| 2,221,321 | Foron | Nov. 12, 1940 |